Oct. 7, 1958 W. M. McCONNELL 2,855,020
DRIVING MECHANISM FOR EXPANDING PIPE
Filed Dec. 6, 1955 3 Sheets-Sheet 2

INVENTOR.
William M. McConnell
BY
Webb, Mackey & Burden
HIS ATTORNEYS

Oct. 7, 1958     W. M. McCONNELL     2,855,020

DRIVING MECHANISM FOR EXPANDING PIPE

Filed Dec. 6, 1955     3 Sheets-Sheet 3

INVENTOR.
William M. McConnell

BY Webb, Mackey & Burden
HIS ATTORNEYS

United States Patent Office 2,855,020
Patented Oct. 7, 1958

2,855,020

DRIVING MECHANISM FOR EXPANDING PIPE

William M. McConnell, McKeesport, Pa., assignor to Taylor-Wilson Manufacturing Company, McKees Rocks, Pa., a corporation of Pennsylvania Application December 6, 1955, Serial No. 551,407

11 Claims. (Cl. 153—80.5)

The present invention relates to driving mechanism for a pipe expanding mandrel, particularly fluid driving mechanism for hydraulically pushing an expanding mandrel through pipe to enlarge the girth thereof. Subjecting metal pipe to an expanding operation for changing it from an initial state to an expanded state results in an improvement in the wall structure and properties of the metal through the consequent working of the metal crystals and further results in increasing the diameter and volumetric carrying capacity of the pipe. The present invention is particularly useful for driving a pipe expanding mandrel for this metal working purpose, but broadly, however, the present driving mechanism is useful in many applications involving a ram thrust for motive power or a motive pulling force, especially where the thrust or pulling force is necessarily active over relatively extensive rectilinear or curvilinear distances.

In the past, ram members for use in forcing other members of a mechanism to move have been driven by means of reciprocable driving apparatus having a stroke, the effective length of which is of the same order as the length of travel of the ram member. Prior known reciprocable driving apparatus of the hydraulic type, for instance, has employed piston and cylinder motors of which the piston rod, usually double acting, is at least as long as the ram stroke desired, thereby requiring a commensurately long cylinder structure which is necessarily costly and bulky. Thus, in the case of hydraulic mandrel drive mechanisms for expanding or otherwise deforming pipe sections partly throughout or fully throughout their lengths by means of the mandrel, the hydraulic cylinder and the piston rod must approximate in length the length of the deformed part of the pipe section and, in this case where some pipe sections are 50–60 feet in length, the hydraulic cylinder must have a physical length and an operating stroke substantially 50–60 feet long for accommodating and fully expanding an entire pipe section in one operation.

According to the present invention, an apparatus is provided having relatively short-stroke ram driving parts which act in alternation with one another to force the ram to move throughout its entire length which is preferably a substantially large multiple of the lengths of the individual strokes. It is an object of the invention to provide hydraulically actuated piston and cylinder parts engageable with the ram at alternately spaced apart points therealong and whose working and recovery strokes are approximately 180 degrees out of phase with one another to the end that a working stroke is continuously in progress at all times to keep the ram continuously in motion. The working stroke, which is under load, necessarily takes somewhat longer for each part than does its unloaded recovery stroke. In pipe expansion work, the foregoing continuous motion produced by the parts operating out of phase, when applied to the mandrel carrying ram, causes the metal of the pipe to be kept flowing about the mandrel once the latter has started at the initially engaged unexpanded end of the pipe, and the marked advantage of keeping the metal continuously flowing as the mandrel moves through the pipe until the expansion is complete for all unexpanded portions, renders the present continuous drive mechanism particularly suited to pipe expansion work. The noted out-of-phase power operation is performed somewhat after the manner of a manual hand-over-hand operation but eliminates the physical attendant with the latter, is accurately timed, and is predeterminedly arranged whereby the working stroke, though inherently equal in length to the recovery stroke, inherently requires more time for the completion thereof.

Further features, objects, and advantages of the present invention will either be specifically pointed out or become apparent when, for a better understanding of the invention, reference is made to the following description taken in conjunction with the accompanying drawings in which, in general:

Figure 1:
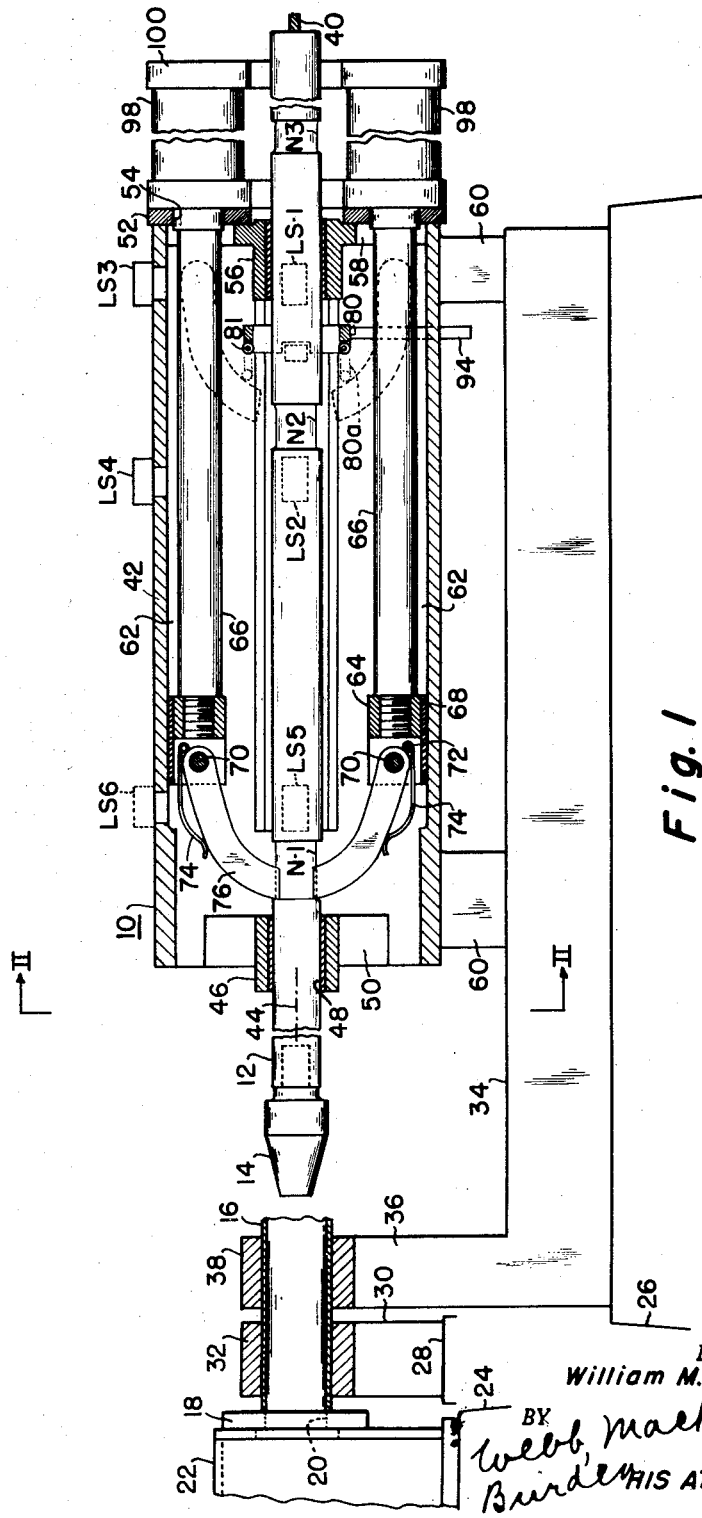
Figure 1 is a longitudinal sectional view of the present apparatus in side elevation.
Figure 2:
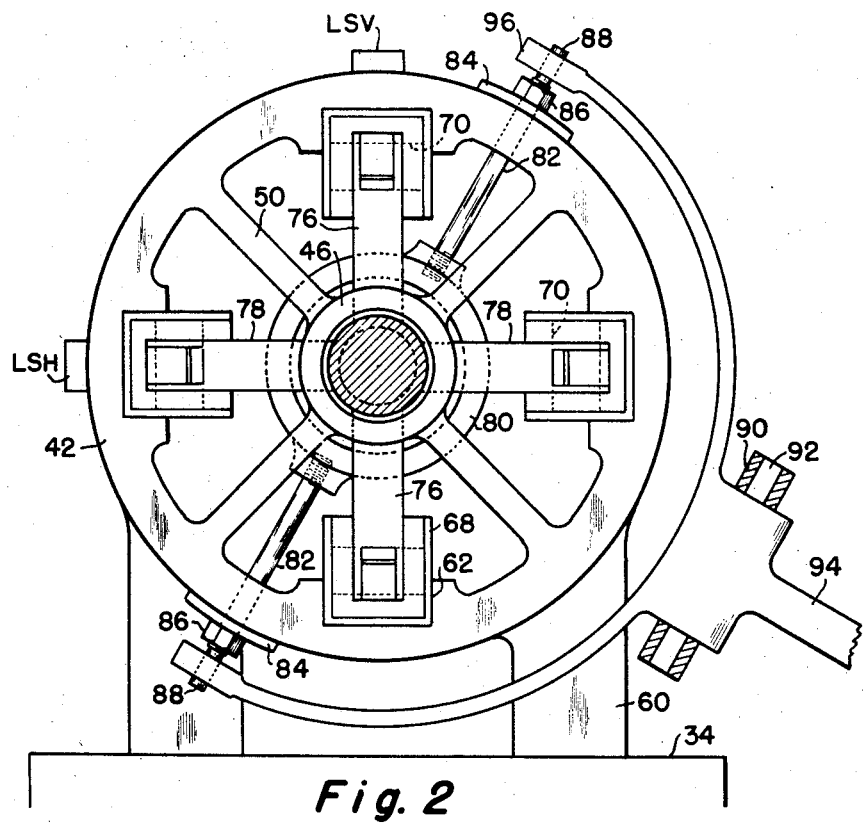
Figure 2 is a transverse sectional view taken along the line II—II of Figure 1.

In Figures 1 and 2 of the drawings, the present hydraulic driving apparatus indicated at 10 is for use in forcing a ram or mandrel bar 12 and a tapered die or mandrel 14 carried thereby to travel from one end to the other through a piece of unexpanded pipe 16, preferably steel pipe. The smaller anterior end of the tapered mandrel 14 fits within the inside dimensions of the pipe 16, whereas the posterior larger or flared end is larger than the internal dimensions of the pipe 16 and, when pushed or forced through the latter, causes the pipe 16 to extend by as much as five or ten percent in girth, depending on the amount of interference between the mandrel and the pipe. The left end of the pipe 16 which is opposite to the end initially engaged by the mandrel 14 engages a stop plate 18 having a circular aperture 20 of which the inside diameter is less than the outside diameter of the pipe 16 both before and after expansion, but the aperture inside diameter is greater than the inside diameter of the pipe both before and after expansion. The aperture 20 and the pipe 16 coaxially register with one another to define a straight path of travel for the mandrel 14. A hollow backup stand 22 supported on an upright pedestal 24 rigidly carries the stop plate 18 which engages and serves as a reaction stop for the pipe 16 during expansion. Between the upright pedestal 24 and upright main pedestal 26 for supporting the apparatus 10, there may be provided one or more intervening pedestals 28 having intermediate pipe supports 30 thereon, each of which carries a set of detachable pipe clamps such as 32. The main pedestal 26 carries a heavy cast bed 34 which at one end includes a pipe support 36 carrying a set of detachable pipe clamps 38 similar to the clamps 32. The detachable clamps 38, 32 are arranged to be detached and removed from the exterior of the pipe 16 as soon as the driven mandrel 14 approaches the vicinity of the clamp.

The driven tapered mandrel 14 has a detachable pin and socket connection to one end of the mandrel bar 12 and is adapted to be removed from the end of the mandrel bar after the bar 12 has negotiated the full length of the pipe 16 so as to leave the mandrel 14 exposed at the opposite end thereof within the hollow interior of the backup stand 22 which has a large mandrel receiving opening registering with the aperture 20 in the stop plate 18. Retractive motion of the mandrel bar 12 following removal of the mandrel 14 from the pin carrying, socketed end thereof is accomplished by means of a mandrel bar pull-back cable 40 connected thereto at the opposite end of the mandrel bar. After the mandrel bar 12 is removed from a piece of expanded pipe, the mandrel 14 is returned to its socket connection at the end of the bar 12 preparatory to expansion of another piece of pipe 16.

The hydraulic apparatus 10 forms a one-way driving mechanism for pushing the mandrel 14 in one direction, namely to the left, through the pipe 16. The apparatus 10 includes an elongated casing 42 having a longitudinal axis 44 concentric with the axis and path of travel of the mandrel bar 12. The casing 42 has an open end in which there is mounted a ram guide bearing 46 containing a ram engaging sleeve 48 and supported within the casing 42 by means of four or more radially extending ribs 50.

At the opposite end, the casing 42 which is of tubular hollow construction is closed off by means of a cylinder mounting plate 52 which is welded or otherwise rigidly securde thereto, and which is formed with a ring of four piston rod openings 54. Adjacent, but centrally disposed relative to the piston rod openings 54, another ram guide bearing 56 is provided which contains a ram engaging bushing and which is supported in the casing 42 by means of four or more radially extending ribs 58.

An upstanding pair of short, spaced apart lugs 60 mounted to the bed 34 engages the exterior of the casing 42 and supports the same rigidly spaced above the bed 34. Internally thereof, the casing 42 is formed with four longitudinally extending, equally circumferentially spaced apart guide slots 62 which are shallow and of rectangular shape and extend substantially coextensively with the length of the casing 42. Each of the guide slots 62 slidably receives a rectangular, block-shaped crosshead 64 having an axially extending socket which threadably receives a piston rod 66 extending longitudinally into the casing 42 through an appropriate one of the four piston rod openings 54 in the cylinder mounting plate 52. The crossheads 64 likewise being four in number, are of substantially square cross section and each rigidly carries a generally channel-shaped antifriction bushing 68 which slides against and fits within the companion guide slot 62 adjacent thereto. Each of the crossheads 64 carries a transversely extending pivot 70 adjacent to which at 72 a flat biasing spring 74 is swingably mounted. The upper and lower ones of the four pivots 70 in Figure 2 pivotally support the fixed outer ends of a pair of vertically disposed claw lugs 76 which are urged toward one another by means of the springs 74 which are continuously in engagement with an intermediate portion of the outer curved sides thereof. The remaining two pivots 70 pivotally support the fixed ends of another pair of horizontally disposed claw lugs 78. The individual claw lugs of each pair 76 and 78 curve toward one another and their inner free ends are complementary to and conform in curvature with a series of notches N1, N2, N3, etc., provided in the mandrel bar 12 at spaced apart intervals to produce groove forming shoulders engageable by the claw lugs. As presently contemplated, the pairs of claw lugs 76, 78 act in alternation to one another in a manner hereinafter described whereby only the set of vertical claw lugs, for instance, 76, engage with the notches N1, N3, etc., and the horizontal pair of claw lugs 78 engage with the notches N2 and N4, etc. The stroke of the two pairs of claw lugs 76, 78 is slightly greater than the distance between the respective notches N1, N2, N3, and their operation is such that the claw lugs initially engage the bar 12 at a point directly at or slightly posterior to the notch in which they are received, and, being unengaged and unloaded at the time, the claw lugs tend to move faster than the bar 12 and, hence, progress along the length thereof to a point at which they exactly register with and engage an appropriate notch under bias of the springs 74.

Means is provided for disabling the pairs of claw lugs 76, 78 to prevent unwanted engagement of the same with the notches in the mandrel bar 12.

Illustrative of one example of disabling means is a ring 80 supported within the casing 42 adjacent the bearing 56 at the closed end thereof. The ring 80 carries a set of four rollers 81 which are engageable with the inner curved sides of the claw lugs of each pair of the claws 76, 78. The ring 80 has a pair of radially extending studs 82 rigid therewith and extending through a set of longitudinally disposed slots in the casing 42 and retained for sliding movement therealong by means of a set of guide plates 84 carried by the studs 82. The protruding ends of the studs 82 are threaded to receive guide retaining nuts 86 and have smooth portions 88 at their outer ends. Operating means for the ring 80 includes a stationary support bearing 90 which supports a rockshaft 92. The rockshaft 92 swingably supports the midportion of a manually operated lever 94 which is bifurcated at its inner end and carries a fork 96 at each inner extremity thereof which straddles the smooth portion 88 of the studs 82 carried by the ring 80. Appropriate swinging motion of the lever 94 about the rockshaft 92 as a center causes the ring 80 to shift from the retracted solid line position of Figure 1 into the advanced position shown by the lotted lines 80a in which the rollers 81 thereof engage the claws 76 or 78 or both, and cause the same to undog and be held at their free ends out of the path of travel of the ram bar 12 and in a spaced apart location from the notches N1, N2, N3.

The cylinder mounting plate 52 mounts a set of four piston and cylinder motors which are double acting and each of which includes one of the reciprocable piston rods 66 and an appropriate hydraulic cylinder 98 which latter is mounted at its inner end rigidly to the cylinder mounting plate 52. The outer ends of the cylinders 98 are supported in a set of openings formed in a common plate 100 for which a support pedestal, not shown, may be appropriately provided.

One of the guide slots 62 in which the horizontally disposed claw lugs 78 are slidably received, includes a series of limit switches LSH, Figure 2, for controlling the horizontally disposed lugs 78. The upper one of the guide slots 62 for the vertically disposed claw lugs 76 includes another series of limit switches LSV, Figure 2. The switches of the series LSH are spaced apart and comprise a rear limit switch LS1 and another limit switch LS2 adjacent thereto and may also comprise a further limit switch LS5, if desired. The limit switches LSV comprise a rear limit switch LS3, an adjacent limit switch LS4 and also another limit switch LS6, Figure 1, which may be provided, if desired. The limit switches LS1 through 6 are mechanically finger actuated in response to motion of the crosshead 64 and are more particularly seen in Figure 3.

Figure 3:
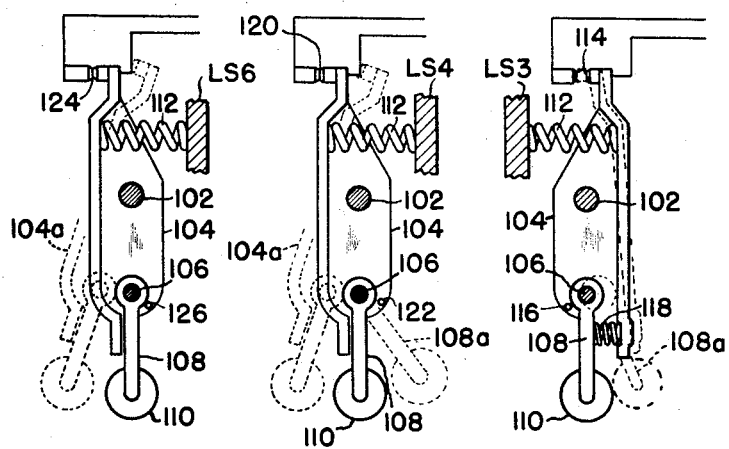
Figure 3 is a fragmentary view of the motion sensitive limit switches of the apparatus of Figure 1.

In Figure 3, the limit switches LS3, LS4 and LS6 which are identical with the respective limit switches LS1, LS2, and LS5 in the horizontal series LSH, include a set of fixed pivots 102 which are stationary with respect to the casing 42 and on which the individual switch actuating members 104 are swingably supported. The actuating members 104 are radially disposed relative to the casing 42, being generally U-shaped in cross section and having a transverse base and a pair of parallel side legs which are apertured and through which the support pivots 102 pass. The side legs further include another pivot 106 adjacent the radially inner end of the member 104 and swingably supporting the fixed end of a pendulum-type switch actuating finger 108. The actuating finger 108 at the free end thereof carries a roller 110 normally disposed in the path of travel of the corresponding crosshead 64 and engageable thereby for conjoint movement a short distance therewith. Each of the actuating members 104 at the radially outer end thereof is engaged by means of a foreshortened helical spring 112 acting in compression thereagainst and seated on the case of the respective switches LS3, LS4, and LS6. In the limit switch LS3, a pair of normally open contacts 114 is provided at the outer end consisting of a fixed supply connected contact at the left and a movable solenoid connected contact at the right which is carried by the actuating member 104. The spring 112 acts under compression in a direction to bias and hold the contacts 114 open. A stop 116 is provided adjacent the switch actuating finger 108 to limit the movement thereof and a similar stop, not shown, may be provided to limit the rocking movement of the actuating member 104. A relatively strong coil spring 118 at the inner end of the actuating member 104 acts in compression between the base of the member 104 and the finger 108 and provides for yieldable lost motion of the swinging finger 108 to overtravel into a dotted line position 108a after the member 104 rocks counterclockwise and the contacts 114 are closed. The switch LS4 has a pair of normally closed fixed and movable contacts 120 consisting of a supply connected fixed contact at the left and a solenoid connected contact at the right. Movement of the crosshead 64, not shown, into engagement with the roller 110 so as to swing the same to the left causes the finger 108 to engage the base of the member 104 and cause the member 104 to swing into the dotted line position 104a in which the normally closed contacts 120 are opened. Movement of the roller 110 from the solid position of Figure 3 to the right due to engagement with the crosshead 64, not shown, permits the finger 108 to swing idly to the dotted line position 108a without opening the contacts 120 and without moving the actuating member 104. A stop 122 is provided to limit the swinging movement of the switch actuating finger 108, and another suitable stop, not shown, may be provided for limiting the rocking movement of the actuating member 104.

The switch LS6 in Figure 3 has a pair of normally closed fixed and movable contacts 124 consisting of a supply connected fixed contact at the left and a solenoid connected swinging contact at the right. The engagement of the roller 110 so as to swing the same from the solid line position of Figure 3 to the leftward causes engagement to occur between the base of the member 104 and the finger 108, whereupon the actuating member 104 rocks into the dotted line position 104a about the fixed pivot 102 as a center. A limiting stop 126 may be provided to limit the free swinging motion of the finger 108.

Control means is provided for hydraulically controlling the double acting piston and cylinder motors 98 for operating the horizontal and vertical claw lugs 78, 76.

Figure 4:
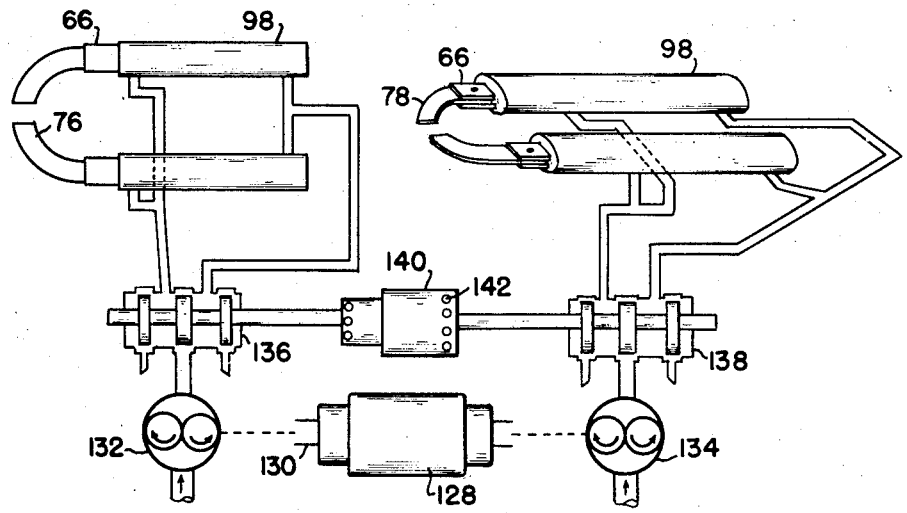
Figure 4 is a diagrammatic view illustrating the hydraulic system of the present apparatus.

Illustrative of one example of such hydraulic control means is the pump and control valve arrangement of Figure 4. In Figure 4, an electric motor 128 has a drive shaft 130 common to a hydraulic pump 132 for the cylinders for the vertical pair of claw lugs 76 and to a hydraulic pump 134 for the horizontal pair of claw lugs 78. The pumps 132 and 134 draw fluid, preferably oil, or other hydraulic liquid, from a reservoir, not shown, and discharge the same through pipes to supply four-way motor control valves 136 and 138. The motor control valves 136, 138 may be elastically interconnected by means of a telescopic device 140 containing a coil compression spring hereinafter described. One or more air bleed holes 142 may be provided in the ends of the telescopic device 140 to permit the latter to breathe in operation without becoming air bound or acting as a dashpot. The valve 136 is connected at the right end thereof to the front end of the cylinders 98 for driving the vertically disposed pair of claws 76 and is connected at the left end thereof to the rear end of the cylinders 98.

In the rightward position, the valve 136 causes the cylinders 98 to be pressurized at a common pressure at the rear to extend the rods 66 thereof and in equally balanced relationship they perform a working stroke with the vertical claw lugs 76. Shift of the valve 136 to the left causes hydraulic pressure fluid to be forced into the front end of the cylinders 98 so as to retract the piston rods 66 thereof.

The control valve 138 is connected at the right end thereof to the rear end of the hydraulic cylinders 98 for the horizontally disposed pair of claws 78, and shift of the valve 138 to the left causes pressure fluid to be admitted to the hydraulically interconnected rear of the cylinders 98 to perform a working stroke with the horizontally disposed pair of claw lugs 78. Shift of the valve 138 to the right, as urged by the spring loaded device 140, causes the appropriate working cylinders 98 to retract the horizontally disposed claw lugs 78.

The control valves 136, 138 are manually controllable and, in addition, may be controlled automatically by hydraulic pilot valves, but in the present illustrated embodiment of the invention, the latter valves are controlled by solenoids which are electrically interlocked by the system switches LS-1 through LS-6 in their automatic operation.

Figure 5:
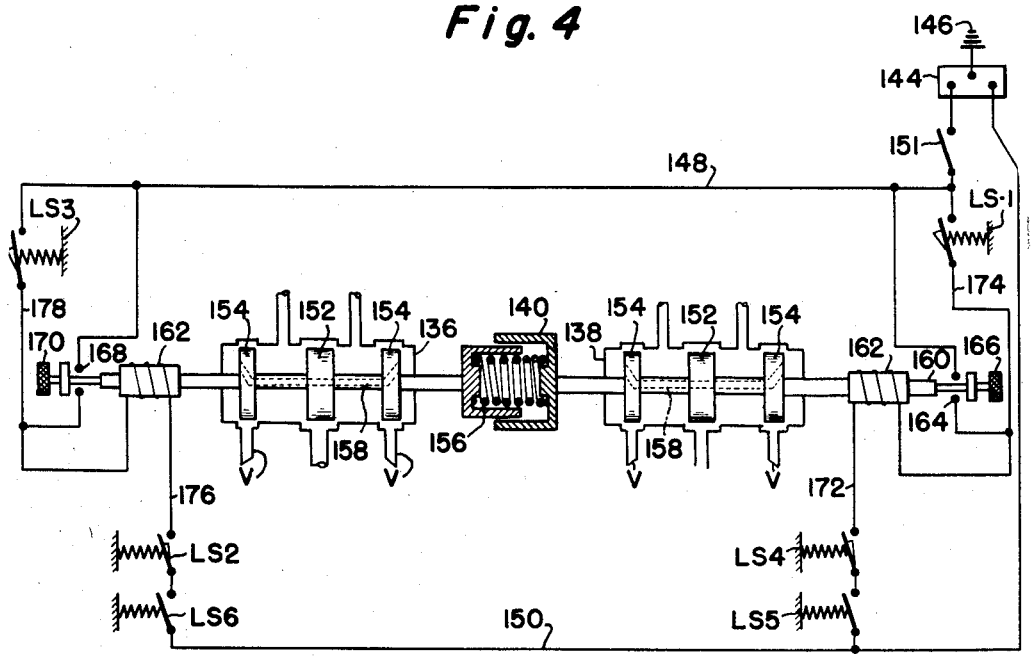
Figure 5 is a schematic electric diagram showing an electrical control circuit containing the limit switches of Figure 3 for controlling the hydraulic system of Figure 4.

Illustrative of the automatic solenoid control of the valves 136, 138 is the wiring diagram according to Figure 5. In Figure 5, an electric power source 144, suitably grounded at 146, supplies a pair of line conductors 148 and 150 which form a circuit controlled by means of a manually operated master switch 151. The four-way valves 136, 138 contain slide valve elements formed with a central spool 152 at their midportion and a pair of end spools 154 at their respective opposite end portions, one end of one valve being adjacent to a corresponding end of the other valve. The telescopic device 140 interconnects the adjacent ends of the two valves 136, 138 and includes a compressed helical spring 156 which constantly acts to separate the slide elements of the valves one from the other, that is to say, to shift the valve 136 into the leftward position to cause retraction of the vertically disposed pair of claws 76 and to shift the valve 138 into the rightward position, tending to case the horizontally disposed pair of clams 78 to be moved into retracted position. The central spool 152 on each of the control valve elements controls a pump connected conduit and is selectively shiftable to direct pressure fluid into the front or rear ends of the cylinders controlled thereby as appropriate. Simultaneously with the working pressurization of the front or rear end of one pair of cylinders, due to movement of the central spool 152, the opposite end spools 154 are appropriately shifted to connect the opposite end of the cylinders to drain through a vent V and to block off the vent V for the working end of the cylinder. Fluid trapped between each of the end spools 154 and the adjacent end of the valve case is freely communicated to the opposite end of the valve element due to an intercommunicating passageway 158 drilled through the spool carrying element.

The outer ends of valves 136, 138 carry an electromagnetically controlled armature 160 which is included in a valve actuating solenoid coil 162. Energization of the coil 162 causes the armature to be drawn thereinto so as to shift the appropriate valves in a direction away from the actuating coil 162. Simultaneously with the shifting of the valve 138 to the left by means of the solenoid coil 162, a pair of solenoid contacts 164 is closed by means of a switch bar connected to the armature 160. The switch bar has a knob handle 166 for the manual operation thereof at its outer end. Another set of contacts 168 is similarly closed by a switch bar carried by the other solenoid coil 162 and the switch bar carries a manual actuating knob or handle 170 at the outer end thereof. The contacts 164 form a holding circuit for the solenoid coil 162 and are included in series therewith in a conductor 172 connected between the two-wire line conductors 148, 150. A branch circuit 174 in parallel with the contacts 164 includes the limit switch LS1 which, when closed, causes the coil 162 to energize and hold itself in circuit through appropriate actuation of the armature 160 to close the holding circuit contacts 164. The limit switch LS4 which is normally closed, is included in the conductor 172 and also the normally closed limit switch LS5 may be included in series with the switch LS4, if provided. The self-holding contacts 168 are included in series with the solenoid coil 162 in a conductor 176 between the two-wire conductors 148 and 150. A branch circuit 178, in parallel with the self-holding contacts 168, includes the normally open limit switch LS3. The normally closed limit switch LS2 is included in the conductor 176 and also the limit switch LS6, if provided, may be included in series therewith.

In the operation of the mandrel driving device of Figures 1 through 5, reference may be particularly had to Figures 1 and 5 in which it can be assumed that the horizontally disposed pair of claws 78 is unloaded and is completing a retractive stroke to the right so as to actuate the limit switch LS1. Actuation of the limit switch LS1 energizes the solenoid coil 162 connected thereto and shifts its armature to close the holding circuit through the contacts 164 and simultaneously shift the slide element in the valve 138 to the leftward. Leftward shift of the valve element 138, in accordance with the description of Figure 4 preceding, causes the horizontally disposed pair of claw lugs 78 to undertake an advancing stroke owing to operation of the appropriate cylinders 98. After a predetermined initial amount of movement, the limit switch LS2 is closed by means of the crosshead 64 so as to open-circuit the conductor 176, Figure 5, and deenergize the solenoid coil 162 controlling the valve 136. Under action of the compressed helical spring 156, the valve 136 shifts to the left and, in accordance with the description of Figure 4 preceding, the vertically disposed pair of claws 76 commence a retractive stroke. Meantime, the horizontally disposed pair of claws 78 continues to travel toward a completed working stroke, at which time the retracting vertically disposed claws 76 engage the limit switch LS3 which causes the solenoid coil 162 connected thereto to energize. Thereupon, the motor control valve 136 is shifted to the right against force of the helical spring 156 to cause the appropriate piston rods 66 and the vertically disposed claw lugs 76 to commence to advance. Subsequently, the opening of the limit switch LS3 is without effect on the circuit due to the self-holding action of the contacts 168 and the vertically disposed claws engage a notch such as N1 or N3 and commence to share the driving load of the working stroke with the horizontally disposed claws 78. After predetermined initial movement of the vertical claws 76 conjointly in the direction of advance with the horizontal claws, the former claws close the limit switch LS4 and open-circuit the conductor 172. The solenoid coil 162 controlling the motor controlling valve 138 thereupon releases the valve element therein which shifts to the right and induces a retractive stroke of the horizontally disposed claw lugs 78. In the event that either set of claws 76 or 78 tends to overextend itself before the other pair of claw lugs has completed its predetermined initial movement of advance, the safety limit switches LS5 and LS6 are effective to open-circuit the conductors 172 or 176, as appropriate, to prevent overtravel of the claws in their extended position.

When the switch 150, Figure 5, is opened, the solenoid coils 162 are deenergized and the shiftable elements of the valves 136, 138 are shifted away from one another due to expansion of the compressed helical spring 156. Thereafter, in accordance with the description of Figure 4, the claw lugs 76 and 78 are retracted by the piston rods 66 and held thereby in their retracted positions. Appropriate manual engagement and actuation of the disabling lever 94, Figure 2, causes the lugs to be lifted by means of the shifting ring 80 out of their positions of possible engagement with the notches in the bar 12, whereupon the bar 12 can be removed by appropriate actuation of the pull-back cable 40. In order to restart the mechanism after the bar 12 has been reinserted within the casing 42, Figure 2, and the disabling lever 94 has been released, Figure 2, the knob 166 or 170, as appropriate in Figure 5, is forcibly pushed manually at the time that the switch 150 is closed. Therefore, only one of the valves 136, 138 causes a pair of claws to advance and as soon as the claws have advanced to a point at which a notch in the bar 12 is adjacent the inactive pair of claws, the knob 166 or 170, as appropriate, is pushed so as to cause the inactive claws to commence their initial movement. After predetermined initial movement in the manner previously described, the claws engage a limit switch which, through appropriate operation of the circuit, Figure 5, causes the other set of claws to reverse their direction of motion for retraction.

It will be apparent from the foregoing that the vertically and horizontally disposed pairs of claws 76, 78 cooperate after the fashion of a hand-over-hand motion wherein the two pairs of claws are approximately 180 degrees out of phase with one another. The fact is to be appreciated, however, that toward the end of the working stroke of each set of claws, the other set of claws is commencing to share the working load therewith such that the latter after, but only after, predetermined initial movement of engagement with an intermediate limit switch causes the former set of claws to reverse their direction for a recovery stroke. Accordingly, the mandrel bar 12 undergoes a continuous uninterrupted movement throughout the entire length thereof. Especially significant is the fact that a group of four relatively short stroke cylinders can provide substantially continuous motion to a mandrel bar whose length is a multiple, for instance, approximately ten to one, of the length of the individual strokes of the cylinders. Inherently, the recovery strokes of the claws, being unloaded, take place considerably faster than their working strokes. During the period in which either sets of claws is moving under load from its predetermined initial position of extended movement of advance to its fully extended position, the other set of claws has ample time to reverse its own direction once to recover, and once more to advance to a point of engagement with a ram notch N so as to share the load with the extended working set of claws.

Variations within the spirit and scope of the invention described are equally comprehended by the foregoing description.

I claim:

1. Apparatus for driving a work performing member along a longitudinally extending axis, including a frame, a casing therein through which said axis passes, said casing having longitudinally extending guideways formed in the wall thereof, pairs of swingably supported opposed claws slidably related to the guideways for reciprocable movement and engageable with the work performing member at spaced points therealong, motors in the frame connected to the pairs of claws and having controlled motor operating means for individually operating the motors to advance and retract their corresponding pairs of claws, and devices sensitive to motion of the pairs of clams into retracted position to control said motor operating means for reversing the motion to cause the claws to advance and sensitive to predetermined inital movement of advance of each pair of claws to reverse the motion of another pair of claws.

2. Apparatus for driving a notched work performing ram along a longitudinally extending axis, including a frame, a casing therein through which said ram is introduced, said casing having longitudinally extending guideways formed in the wall thereof, pairs of swingably supported opposed claws slidably related to the guideways for reciprocable movement and being engageable with the notches on the ram, fluid motors in the frame connected to the pairs of claws and having electrically controlled valve means for individually operating the motors to advance and retract the corresponding pairs of claws, and electric circuit means including limit switches sensitive to motion of the pairs of claws into retracted position to control said motor operating means for reversing the motor motion to cause the claws to advance and sensitive to predetermined initial movement of advance of each pair of claws to reverse the motion of another pair of claws.

3. Apparatus for driving a notched work performing ram along a longitudinaly extending axis, including a frame, a casing thereon through which the ram is introduced, said casing having ram guide bearings in the opposite ends thereof and longitudinally extending guideways disposed between the bearings, pairs of swingably supported opposed claws slidably related to the guideways for reciprocable movement and engageable with the notches on the ram, fluid motors on the frame operatively connected to the pairs of claws and having motor operating valves for individually operating the motors to advance and retract their corresponding pairs of claws, and devices sensitive to motion of the pairs of claws into retracted position to control said motor operating valves for reversing the motor motion to cause the claws to advance and sensitive to predetermined initial movement of advance of each pair of claws to reverse the motor motion for the other pair of claws.

4. A short stroke hydraulic machine to ram a mandrel in a continuous long stroke through pipe to expand the diameter, said machine comprising, in combination with a mandrel bar, a pipe holder comprising back-up means to take the reaction from the pipe introduced by the advancing mandrel bar and mandrel, a frame having spaced ram guide bearings receiving said bar and having longitudinally extending guideways disposed between the bearings, sets of grippers slidably related to the guideways for reciprocable movement and engageable with the mandrel bar at spaced points, hydraulic drive cylinders individual to the sets of grippers for causing the just mentioned engagement of the same at said spaced points and for moving the mandrel bar in overlapped load sharing relationship with one another at least once during each stroke, and reversible valve means included in an electrically interlocked system for separately operating said hydraulic drive cylinders so that one gripper reaching its most advanced position may be retracted and restarted under load while another gripper continues the active advance of the mandrel bar.

5. A machine to ram a mandrel through pipe for expanding the diameter, said machine comprising in combination with a bar provided with an end portion to carry the mandrel, and having spaced notches formed in said bar, a frame having spaced ram guide bearings receiving said bar and having longitudinally extending guideways disposed between the bearings, sets of grippers slidably related to said guideways for reciprocable movement and engageable with different notches on the mandrel bar, hydraulic drive means individual to the sets of grippers for causing the just mentioned engagement of the same at different notches aforesaid and moving the mandrel bar in overlapping load sharing relationship with one another at least once during each stroke, reversible valve means included in an electrically interlocked system for separately operating said hydraulic drive means so that one set of grippers reaching its most advanced position may be retracted and restarted in another notch while another set of grippers continues the active advance of the mandrel bar, said individual hydraulic drive means comprising a plurality of power cylinders hydraulically interconnected at least by pairs so that each pair inherently divides the load and so that each pair in moving the mandrel bar in the overlapping load sharing relationship described strikes a short hydraulic balance with the next pair before the latter takes the load in full, and a single pull-back element connected to the opposite end of said bar from the aforesaid mandrel carrying end portion thereof.

6. A short stroke hydraulic machine to ram a mandrel in a continuous long stroke through pipe for expanding the diameter, said machine comprising in combination with a mandrel bar having attachment means at one end for cooperating witth the mandrel to form a disconnectable joint, a frame having spaced ram guide bearings receiving said bar and having longitudinally extending guideways disposed between the bearings, sets of grippers slidably related to the guideways for reciprocable movement and engageable with the mandrel bar at spaced points, hydraulic drive cylinders individual to sets of the grippers for causing the just mentioned engagement of the same at said spaced points and for moving the mandrel bar in overlapping load sharing relationship with one another at least once during each stroke means for separately operating said hydraulic cylinders so that one set of grippers reaching its most advanced position may be retracted and restarted under load while another set continues the active advance of the mandrel bar, and a pull back cable connected to retract the mandrel bar after the mandrel thereon has emerged from the pipe and been removed through separation at its disconnectable joint with the mandrel bar.

7. A machine to ram a mandrel through pipe for expanding the diameter, said machine comprising in combination with the mandrel and with a mandrel bar having a pin and socket connection therewith to form a disengageable joint, a frame having spaced ram guide bearings receiving said bar and having longitudinally extending guideways disposed between the bearings, grippers slidably related to the guideways for reciprocable movement and engageable with the mandrel bar at spaced points, hydraulic drive means individual to the grippers for causing the just mentioned engagement of the same at said spaced points and for moving the mandrel bar in overlapping load sharing relationship with one another at least once during each stroke, means for separately operating said hydraulic drive means so that one gripper reaching its most advanced position may be retracted and restarted under load while another gripper continues the active advance of the mandrel bar, and a pull back element connected to retract the mandrel bar following the emergence of the mandrel from the pipe and its subsequent removal by separation of said disconnectable joint with the mandrel bar.

8. A short stroke hydraulic machine to ram a mandrel in a continuous long stroke through pipe for expanding the diameter, said machine comprising in combination with a mandrel bar having means at one end for cooperating with the mandrel to form a disconnectable joint, a frame having spaced ram guide bearings receiving said bar, a stop plate disposed outside the bearings and fixed to take the end reaction of the pipe being expanded, said stop plate having an opening large enough to clear the passing mandrel but too small to enable the pipe to pass, longitudinally extending guideways formed in the frame in a disposition between the bearings, grippers slidably related to the guideways for reciprocable movement and engageable with the mandrel bar at spaced points, hydraulic drive means individual to the grippers for causing the just mentioned engagement of the same at said spaced points and for moving the mandrel bar in overlapped load sharing relationship with one another twice during each operation of one hydraulic means, means for separately operating said hydraulic means so that one gripper reaching its most advanced position may be retracted and restarted under load while another gripper continues the active advance of the mandrel bar, and a pull back element connected to retract the mandrel bar through the stop plate opening and through the pipe following removal of the mandrel at the disconnectable joint aforesaid.

9. Pipe expanding apparatus embodying a plurality of power cylinder devices to ram a mandrel in a continuous stroke through elongated pipe to permanently expand the diameter, said apparatus comprising a fixed back-up stand engageable to fix a straight length of the pipe so as to take the reaction introduced in expanding same, a traveling mandrel bar having means forming spaced shoulder parts thereon for driving the same in a working stroke through said fixed length of straight pipe, means supporting said traveling bar with a sliding fit on the supporting portion thereof and carrying a plurality of independently slidable crosshead means movable with only that portion of said bar which for its major portion projects beyond said means in line with said back-up stand, a vertical plate on said supporting means having a ring of openings each registering with one of said crosshead means, and a power cylinder device arranged in each of said openings so as to conform to a path of revolution and repetitively driving said crosshead means at least partly out of phase with one another, said crosshead means being further arranged with biased means for dogging them to alternate shoulder parts in interengaged relationship with said traveling bar whereby said crosshead means operates in load sharing relationship in the direction of said back-up stand both in alternation and at least once in concert on said bar during each full stroke.

10. Apparatus of the character described comprising, in combination, a plurality of crosshead elements, a dog element pivoted to each, a fixed frame in which said elements are symmetrically arranged in a path of revolution therewithin and defining longitudinal grooves in which said crosshead elements are individually slidably mounted for carrying said pivoted elements in opposite longitudinal directions, a mandrel bar supported with a sliding fit in said frame for longitudinal motion, a spring individual to each pivoted element and connected to the associated crosshead element to constantly bias the former inwardly thereof against the mandrel, a piston individual to each dog and connected to drive the associated crosshead element between advanced and retracted positions, and ring means common to the path of said pivoted elements and shiftable to engage them in the aforesaid retracted position to lift said elements from the mandrel bar and undog same.

11. Apparatus of the character described comprising, in combination, a plurality of crosshead elements, a dog element pivoted to each, a fixed frame in which said elements are symmetrically arranged and defining longitudinal grooves in which said crosshead elements are individually slidably mounted for carrying said pivoted elements in opposite longitudinal directions, a mandrel bar supported with a sliding fit in said frame for longitudinal motion, a spring individual to each pivoted element and connected to the associated crosshead element to constantly bias the former inwardly thereof against the mandrel, double acting power cylinder means individual to each dog and connected in an arrangement to asynchronously drive the associated crosshead elements between advanced and retracted positions out of phase with one another whereby at least one of the power cylinder means continues active advance of the mandrel bar while the next restarts its initial movement of advance following full retraction thereof, said power cylinder means being symmetrically arranged in said frame in a path of revolution about said mandrel bar and hydraulically interconnected by pairs so that each pair inherently divides the load and further enabling the next pair to strike a short hydraulic balance therewith in sharing the load of the mandrel bar before taking that load in full.

References Cited in the file of this patent

UNITED STATES PATENTS

| 2,152,712 | Stevens | Apr. 4, 1939 |
| 2,442,325 | Kitlica | May 25, 1948 |
| 2,695,096 | Gridley | Nov. 23, 1954 |
| 2,754,117 | Ghormley | July 10, 1956 |

FOREIGN PATENTS

| 457,626 | Germany | Mar. 21, 1928 |